(12) United States Patent
Cadamuro et al.

(10) Patent No.: US 7,055,198 B2
(45) Date of Patent: Jun. 6, 2006

(54) CUSHIONING MEMBER HAVING A WAVY OUTLINE

(75) Inventors: Vania Cadamuro, Vicenza (IT); Roberto Cadamuro, Vicenza (IT)

(73) Assignee: Gilda Design Di Vania Cadamuro, Vicenza (IT)

( * ) Notice: Subject to any disclaimer, the term of this patent is extended or adjusted under 35 U.S.C. 154(b) by 73 days.

(21) Appl. No.: 10/792,136

(22) Filed: Mar. 4, 2004

(65) Prior Publication Data

US 2004/0197529 A1 Oct. 7, 2004

(30) Foreign Application Priority Data

Mar. 4, 2003 (IT) .......................... PN2003A0018

(51) Int. Cl.
*A47C 17/86* (2006.01)
(52) U.S. Cl. .................................. 5/652; 5/944; 36/28
(58) Field of Classification Search .................... 5/652, 5/653, 944; 36/27, 28; 428/174, 181
See application file for complete search history.

(56) References Cited

U.S. PATENT DOCUMENTS

| | | | | |
|---|---|---|---|---|
| 4,383,342 A | * | 5/1983 | Forster | 5/731 |
| 4,509,510 A | * | 4/1985 | Hook | 601/28 |
| 5,607,749 A | * | 3/1997 | Strumor | 428/156 |
| 6,241,695 B1 | * | 6/2001 | Dabir | 601/136 |
| 6,383,153 B1 | * | 5/2002 | Dabir | 601/136 |
| 6,675,500 B1 | * | 1/2004 | Cadamuro | 36/27 |
| 6,689,077 B1 | * | 2/2004 | Dabir | 601/136 |
| 2001/0007177 A1 | * | 7/2001 | Brown et al. | 36/27 |
| 2004/0197529 A1 | * | 10/2004 | Cadamuro et al. | 428/174 |
| 2005/0008825 A1 | * | 1/2005 | Casey et al. | 428/174 |

* cited by examiner

*Primary Examiner*—Robert G. Santos
(74) *Attorney, Agent, or Firm*—Wenderoth, Lind & Ponack, L.L.P.

(57) ABSTRACT

The present invention refers to a cushioning member with an undulating conformation comprising a plurality of elastically deformable bands provided in a juxtaposed arrangement relative to each other according to a substantially longitudinal orientation, wherein each such band features a plurality of undulations which are inclined relative to a resting plane, and a plurality of joining strips are provided between at least two bands and arranged transversely relative to these bands. The cushioning member is produced as a single-piece molding, in which the bands are integral with the strips and are assigned a final and definitive shape thereof, as required for use to which the cushioning member is intended to be put.

28 Claims, 6 Drawing Sheets

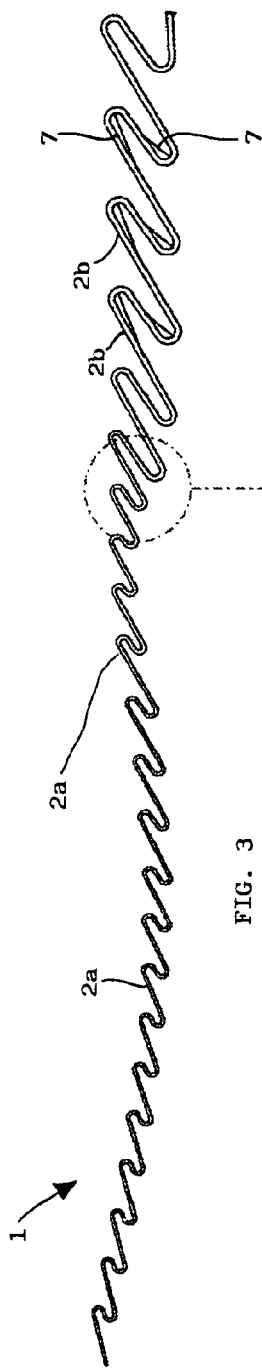
FIG. 3
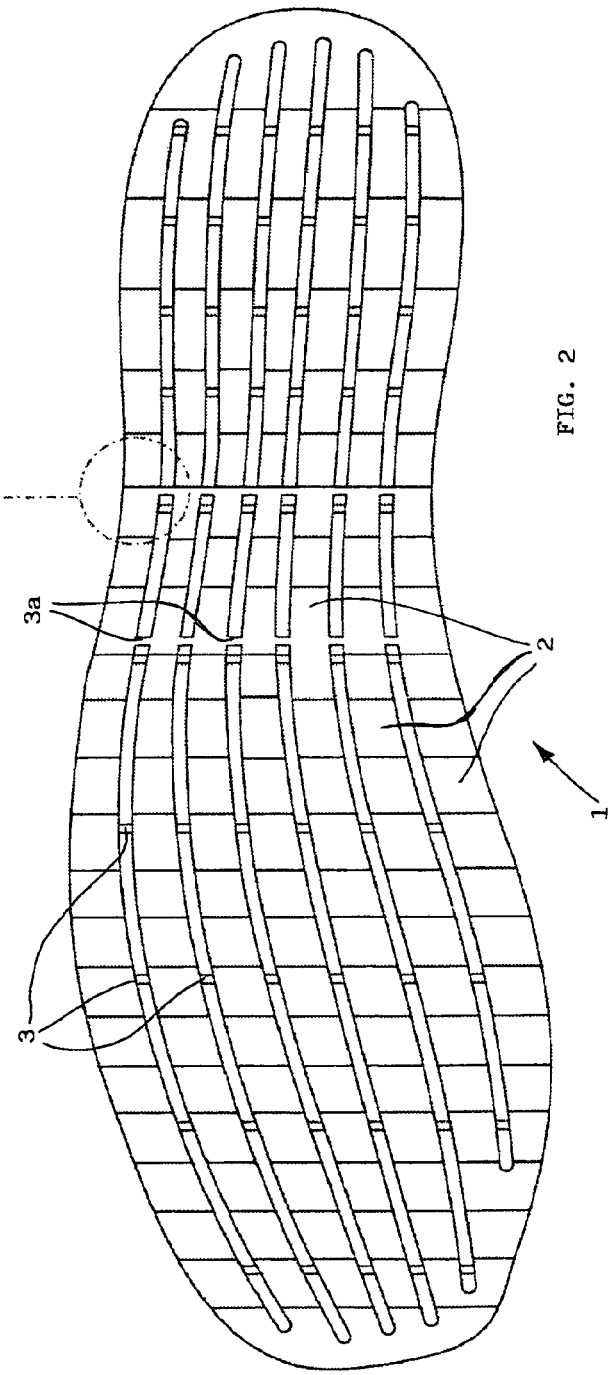
FIG. 4
FIG. 2

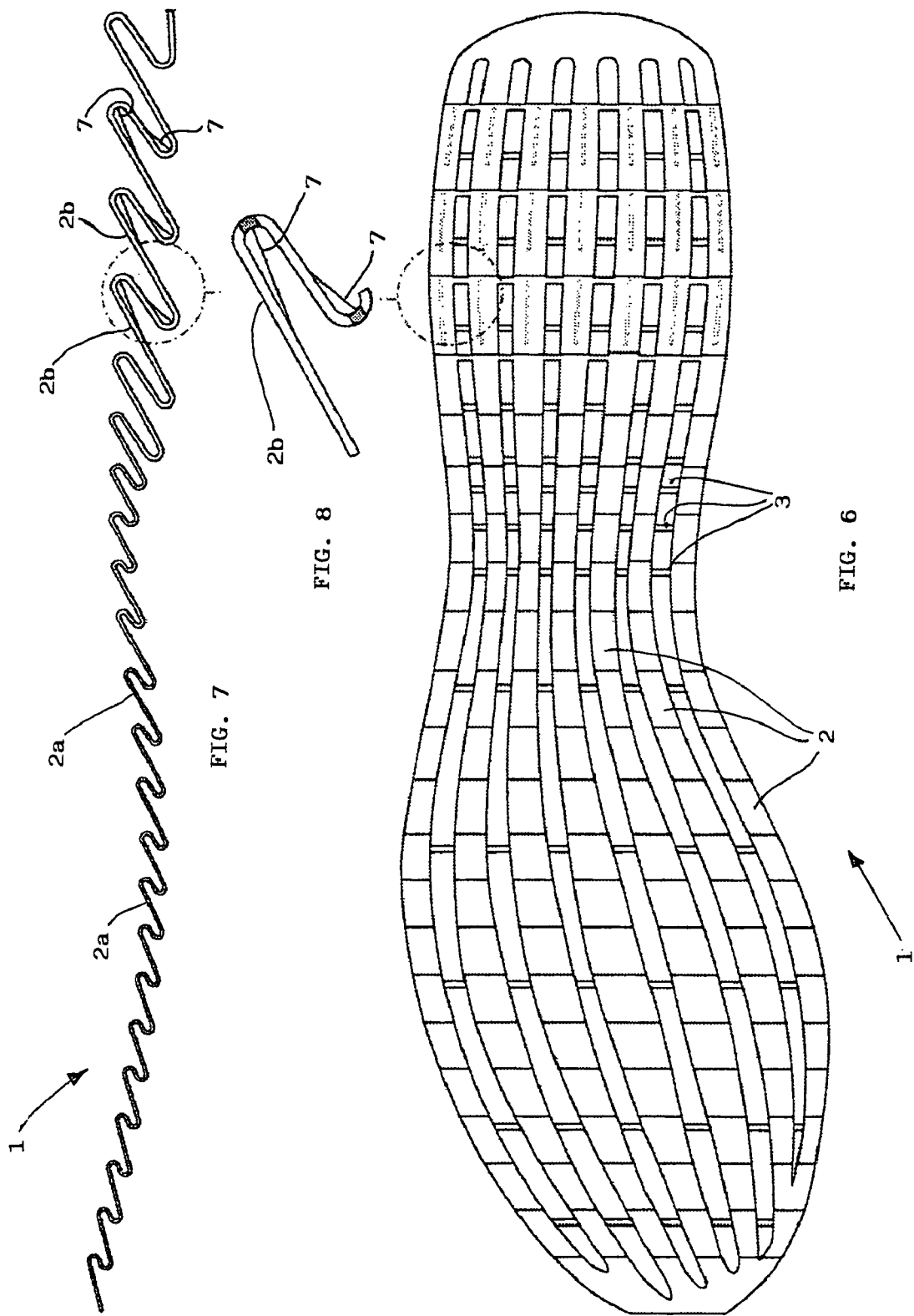

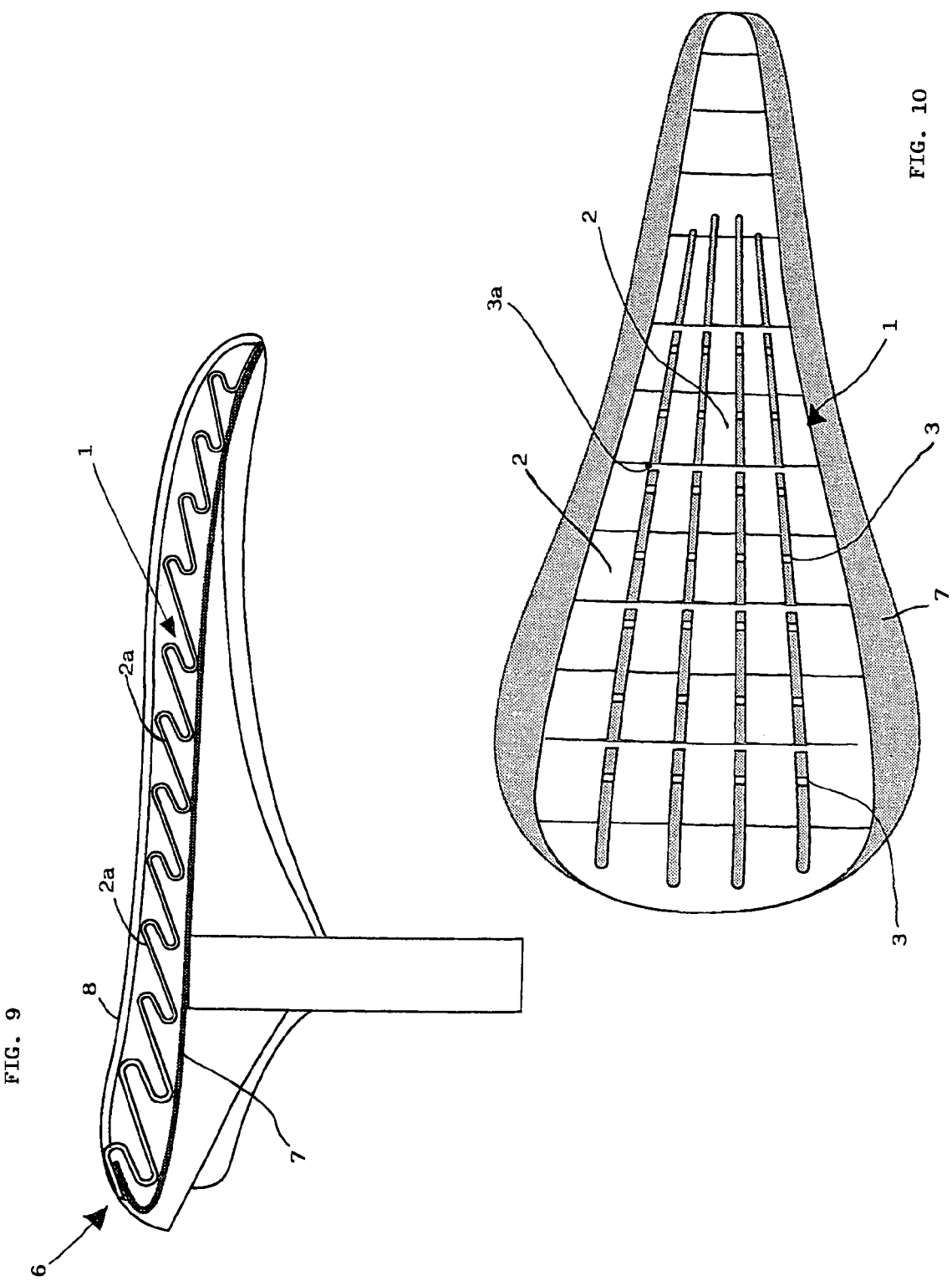

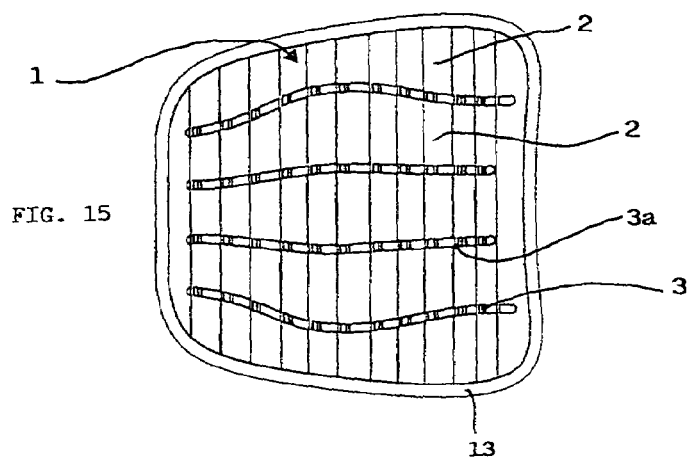
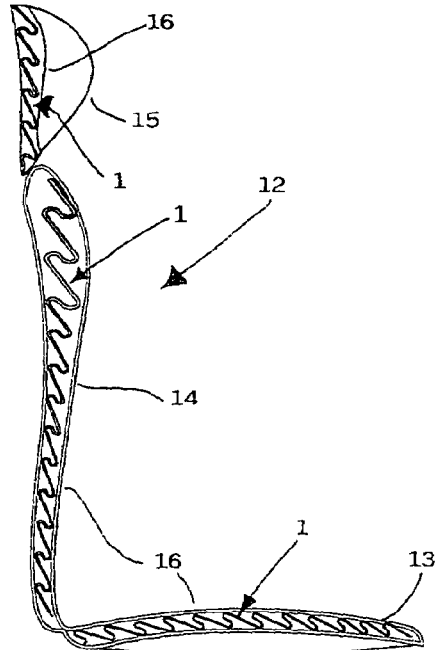
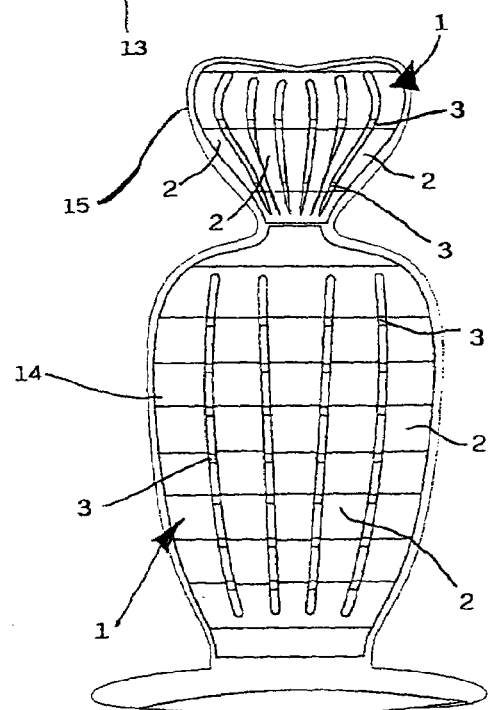
FIG. 15
FIG. 13
FIG. 14

CUSHIONING MEMBER HAVING A WAVY OUTLINE

BACKGROUND OF THE INVENTION

The present invention refers to a cushioning member having an undulating, i.e. wavy conformation for supporting one or more parts of a human body on a resting surface thereof. A cushioning member of such a kind may for instance be used in footwear articles, chairs, vehicle seats, saddleries and upholstering shops in general, furniture accessories and fittings such as chairs, mattresses, pillows and the like, leisure products and items such as inflatable mattresses, pads, pillows and the like, and in any application in which it is advantageous to provide a cushioned support in view of making it more comfortable for one or more parts of the body to rest thereupon.

Italian Patent Application No. FI2000A000215, filed on Oct. 20, 2000 by this same Applicant, describes a cushioning footwear sole comprising a plurality of cushioning modules provided in a juxtaposed arrangement in a longitudinal direction. Each one of such modules consists of a thread-like element made of a high-strength and high-rigidity material, and bent in such a manner as to form a sequence of eyelets lying on a plane that passes along a longitudinal axis of the modules and is normal to a ground plane, in a concordantly inclined manner, so that each such eyelet, following a sole impinging against the ground, will bend, i.e. deflect with such a pliability, i.e. yieldingness as allowed for by a length thereof, and tends then to regain, under an immediate spring-back effect, its non-deformed condition, substantially according to a damped aperiodic harmonic motion mode. The greater or smaller extent of pliability, or yieldingness, further depends on the smaller or greater a density with which the modules are arranged transversely.

Although it proves particularly advantageous, a technical approach described above, however, turns out as being rather complex from a production point of view. As a matter of fact, various modules are manufactured by performing an extrusion process using a mold that has a shape matching a longitudinal section of the modules themselves, and an obtained semi-finished product is formed by an undulated, i.e. corrugated plate, from which individual modules are then cut. In addition, assembling the individual modules together involves each single module, which is generally rectilinear in its cut-off state, being first of all brought into shape manually, and an entire assembly being then secured in a predetermined position so as to obtain a final shape for application to a sole. Various modules are fastened by sewing them directly on to the sole or through proper hook-on members that act as spacers. It may therefore be readily appreciated that a process needed to produce and assemble the individual modules is necessarily quite a long and complex one, owing to its including a number of operational steps involving considerably high costs to perform them.

Furthermore, the modules shall have differing lengths and conformations, depending on both a final shape of an assembly that has to be obtained and different sizes of shoes, boots or whichever other products that have to be manufactured therewith. This entails a need for a considerable number of molds to be provided and used to comply with an entire production variety, and this of course entrains quite considerable costs with it.

A further limitation imposed by this technical approach is connected with difficulties for assemblies formed by the individual modules to be given shapes that correspond exactly with a shape of a component part with which they are to be associated (i.e. soles in a particular case being considered), considering limited ability of modules constituted by rectilinear thread-like elements to be brought into a desired shape, i.e. to allow for any wide extent of moldability into shape.

It therefore is an object of the present invention to provide a cushioning member having an undulating, i.e. wavy conformation, which is particularly advantageous not only from a functional point of view, but also from a production-related point of view.

SUMMARY OF THE INVENTION

Within this general object, it is a purpose of the present invention to provide a cushioning member of the above-indicated kind, which is capable of being obtained, i.e. produced both easily and rapidly, thereby enabling a greater productivity and a higher efficiency to be achieved, as accompanied by a sensible reduction in production and assembly costs, and related time requirements.

Still another purpose of the present invention is to provide a cushioning member of the above-indicated kind, which is able to be given the most varied final shapes, thereby allowing a most suitable shape to be defined with a wide degree of freedom for any and each different application for which it may be intended.

Finally, an equally important purpose of the present invention is to provide a cushioning member of the above-indicated kind, which is capable of being produced competitively from a cost-related point of view, using generally known tools and machines.

According to the present invention, these aims and advantages, along with further ones that will emerge from the following description, are reached in a cushioning member with an undulating structure, which incorporates features and characteristics as recited in the appended claims.

BRIEF DESCRIPTION OF THE DRAWINGS

Features and advantages of the present invention will be more readily understood from a description of some preferred, although not sole embodiments, that is given below by way of non-limiting examples with reference to the accompanying drawings, in which:

FIG. 2 is a plan view of the cushioning member shown in FIG. 1;

FIG. 3 is a side elevational view of the cushioning member shown in FIG. 1;

FIG. 4 is a side elevational view of a detail of the cushioning member;

FIG. 6 is a plan view, similar to the one appearing in FIG. 2, of a second embodiment of the cushioning member according to the present invention;

FIGS. 7 and 8 are side elevational views of the cushioning member shown in FIG. 6 and a detail thereof, respectively;

FIG. 9 is a side cross-sectional view of a bicycle seat incorporating a cushioning member according to the present invention;

FIG. 10 is a plan cross-sectional view of the bicycle seat shown in FIG. 9;

FIG. 13 is a side cross-sectional view of a chair incorporating a plurality of cushioning members according to the present invention;

FIG. 14 is a front view of the chair shown in FIG. 13; and

FIG. 15 is a plan view of a seat of the chair shown in FIG. 13.

DETAILED DESCRIPTION OF THE PREFERRED EMBODIMENTS

Figure 1:
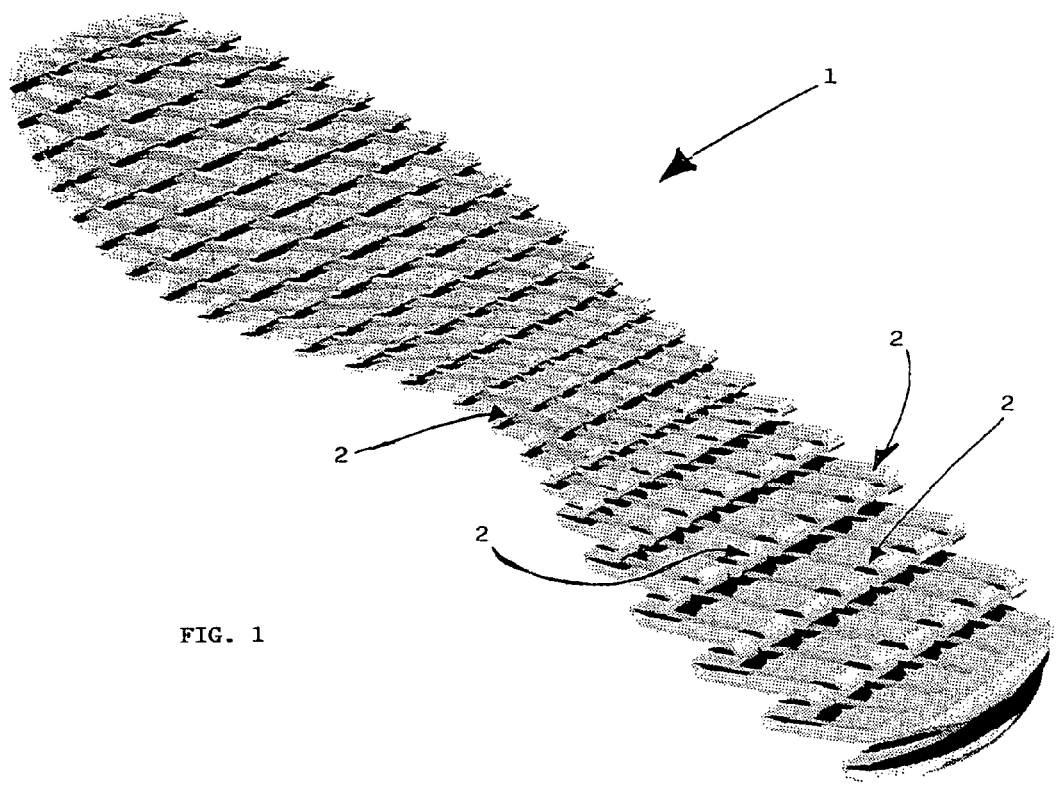
FIG. 1 is a perspective view of a cushioning member according to the present invention, intended for use in footwear applications.
Figure 5:
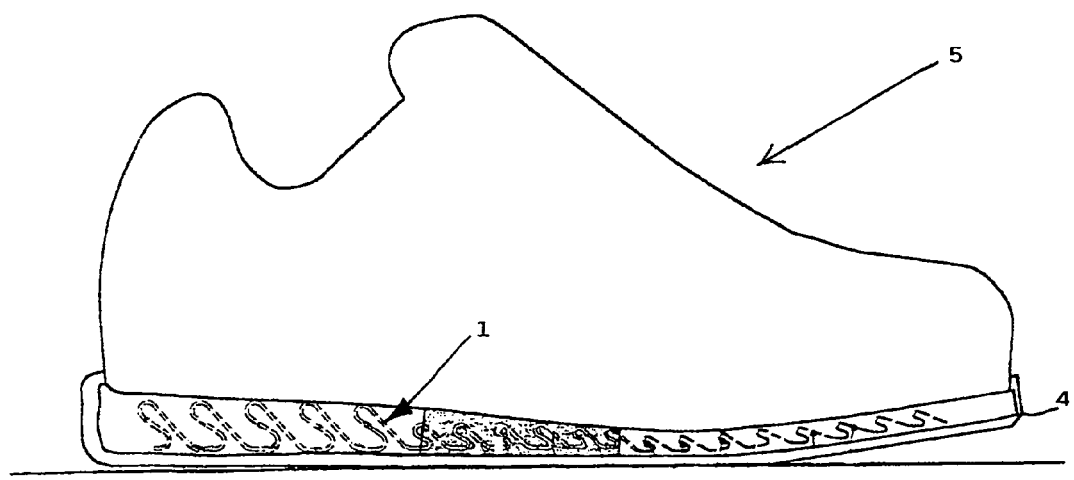
FIG. 5 is a side cross-sectional view of a footwear item incorporating a cushioning member according to the present invention.

With reference to the above-noted Figures, reference numeral 1 is used to generally indicate a cushioning member comprising a plurality of elastically deformable bands 2 having a wavy, i.e. undulating structure, so as described in the aforementioned Italian Patent Application No. FI2000A000215, which is assigned to the assignee of the present invention, and which is incorporated herein by reference. These bands are provided in a juxtaposed arrangement relative to each other according to a substantially longitudinal orientation, wherein each single undulation 2a of this undulating structure is inclined with respect to a resting plane of the cushioning member 1, so that each single undulation 2a forms an acute or obtuse angle with the resting plane.

To complete a structure of the cushioning member 1 there are furthermore provided a plurality of strips 3 connecting two or more bands 2 together and ensuring stabilization of the cushioning member 1 in its entirety. The strips 3 are arranged so as to extend in an approximately traverse direction with respect to, i.e. across, the bands 2, and may be such as to cover a full width extension of the plurality of bands 2, so that each strip 3 will actually join all bands 2 to each other, or each strip 3 may be such as to join at least two bands 2 to each other, so as to be able to obtain joining zones that are possibly offset from each other, according to a desired cushioning effect that is to be obtained.

According to an innovative aspect of the present invention, the cushioning member in its complete and finished state and, therefore, as formed by the plurality of bands 2 connected together by the strips 3, is obtained as a single-piece molding of a suitable thermoplastic material or by any other appropriate and equivalent forming method known as such in the art that is effective in enabling such member to be produced as a single-piece part. As a result, the bands 2 are made integral with related connecting strips 3 and are directly formed into a final and definitive shape as required in view of actual use to which the cushioning member 1 is intended to be put, without any need arising for further processing steps to be provided successively in order to produce a finished product.

Through such contrivance, therefore, a possibility is given for the cushioning member 1 to be directly obtained in a most suitable shape and configuration thereof, in view of various applications and uses for which it may actually be intended.

For example, the accompanying FIGS. 1 to 5 can be noticed to illustrate a configuration of a cushioning member 1 according to the present invention for application to a sole 4 of a footwear item 5. It may be readily noticed that, in this case, the bands 2 are such as to exactly replicate a shape of the sole 4, within which the cushioning member 1 itself is housed, while featuring an optimized orientation and shape pattern for various resting zones to be supported elastically. The connecting strips 3 may be arranged below a lower surface of the bands 3 or, and possibly just at pre-determined zones, they may be provided so as to be co-planar with the bands 2, and this is illustrated in the case of strips 3a in FIG. 2. Furthermore, the strips 3 and/or 3a may be given a differentiated shape and/or thickness pattern according to a cushioning effect that has desirably to be obtained at determined resting zones of a foot.

The cushioning member may advantageously be provided with a protective or covering layer, for instance of fabric, leather or any other suitable material, which is preferably obtained by over-injecting plastic material onto this protective layer. Even in this case, a molded product is readily and directly obtained as a finished product ready for use in an intended application. For instance, with reference to FIGS. 1 to 5, the cushioning member 1 may be used as an insole insert within the footwear item 5, by having a suitable protective layer, e.g. of such material as felt, leather or the like, duly associated on a top and/or on a bottom of it by performing an over-injection process.

In view of obtaining a differentiated cushioning-effect pattern along a surface of the cushioning member 1, there are advantageously provided at least one undulation 2b that is reinforced by fins 7, which are again molded integrally with the cushioning member 1, and which are provided at a site where this at least one undulation 2b undergoes elastic deformation or bending, and this is best illustrated in FIG. 3. In this way, a support capacity of the cushioning member 1 at this reinforced portion thereof turns out to be greater than at other portions thereof, such that a greater load or force has to be applied thereon in order to bring about a same extent of deformation. Preferably, the fins 7 may be provided at a heel zone or portion of the cushioning member upon which a heaviest load of a body is actually applying weight, so that a reaction provided by the cushioning member 1 must, as a result, be certainly greater than a reaction provided to a remainder of the foot.

In FIGS. 6 to 8 there is illustrated a different embodiment of a cushioning member according to the present invention, as intended again for use in footwear applications, which can be noticed to feature a different shape and arrangement of both the bands 2 and the strips 3. In particular, the bands 2 of this embodiment feature a differentiated width according to different resting zones or portions. Even in this case, there are advantageously provided undulations 2b that are reinforced by fins 7 provided integral with cushioning member 1 and situated at sites where these undulations 2b undergo elastic deformation or bending, and this is best illustrated in a detail shown in FIG. 8.

Fully apparent from the above description is therefore an ability of the present invention to effectively reach the aforecited aims and advantages by providing a cushioning member having an undulating, i.e. wavy conformation, which is particularly advantageous from both a functional and a manufacturing point of view.

As a matter of fact, the cushioning member according to the present invention can be most easily and rapidly obtained in its finished, ready-for-use form by performing a single manufacturing step, thereby allowing for greater productivity end efficiency under a sensible reduction in assembly costs and time as compared with prior-art solutions.

It should furthermore be specially noticed that the cushioning member according to the present invention proves particularly comfortable for a user, since, further to a cushioned support, it is also capable of providing aeration to parts of the body that rest upon it. As a matter of fact, alternating compression and subsequent recovery, or spring-back motion, of the cushioning member during its use brings about a kind of "pump effect" that favors air circulation through an open structure of the cushioning member 1 itself, wherein an extent of aeration will of course depend also on transpiration characteristics of materials that are possibly used as a protective or cover layer on the cushioning member 1.

In addition, the cushioning member 1 according to the present invention can be obtained, in a finished state within a single manufacturing step, in a number of different forms and shapes, thereby enabling a form that most suitably fits various applications, for which it may be intended, to be defined with a wide degree of freedom.

Accordingly, for instance, FIGS. 9 and 10 can be noticed to illustrate application of the cushioning member 1 according to the present invention to a bicycle seat 6, in which the cushioning member 1 is interposed between a base 7 of the seat 6 and a covering 8 thereof. In an advantageous manner, such covering of the seat may be provided with micro-perforations that would enable an optimum transpiration to take place therethrough, thereby favoring air circulation within the seat itself.

For reasons of greater clarity, the same reference numerals are used in FIGS. 9 and 10, as well as those figures to which reference will be made further on, and correspond to reference numerals that are used in preceding FIGS. 1 to 8 to indicate various details and parts of the cushioning member.

Figure 11:
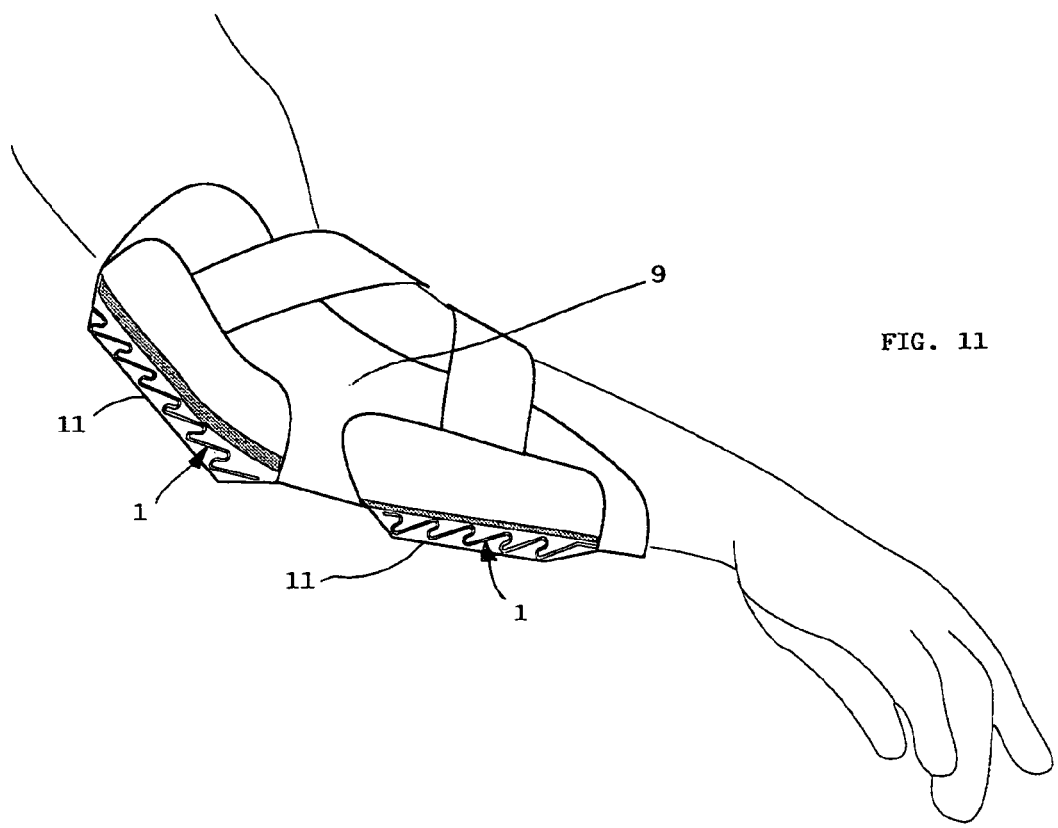
FIG. 11 is a view of an arm brace or guard incorporating one or more cushioning members according to the present invention.
Figure 12:
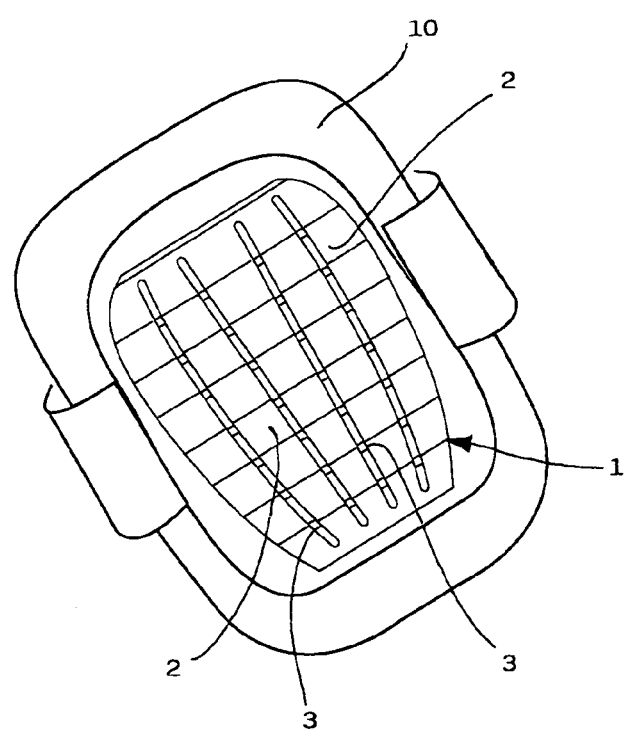
FIG. 12 is a view of a leg guard incorporating a cushioning member according to the present invention.

An example of application of the cushioning member 1 according to the present invention to a guard arrangement for protecting parts of the human body that are exposed to shocks or bumps, for instance when performing sports or physical activities, is illustrated in FIGS. 11 and 12. With particular reference to FIG. 11, the cushioning member 1 is applied to an elbow guard 9, whereas FIG. 12 illustrates application thereof to a knee guard 10. Coverings 11 of the above mentioned guards can advantageously be produced by performing over-injection of the cushioning member 1, i.e. by injecting the cushioning member itself directly upon such coverings; in addition, these coverings can also in this case be advantageously provided with micro-perforations to favor transpiration and air circulation.

FIGS. 13 to 15 illustrate application of the cushioning member 1 according to the present invention to one or more component parts of a chair 12, including seat 13, backrest 14, and headrest 15. Methods used to produce related coverings 16, as well as to enhance transpiration and air-circulation capabilities thereof, are advantageously the same as or similar to the ones that have already been described in connection with the previously considered applications.

It will of course be appreciated that the cushioning member according to the present invention, as described above, may be subject to a number of modifications or may be embodied in a number of different manners without departing from the scope of the invention.

Accordingly, for instance, by applying the same techniques and criteria as described above, the cushioning member may be used in mattresses, pads or pillows of both conventional or orthopaedic type, in inflatable mattresses, pads and mats for leisure applications, in car or vehicle seats and related accessories, such as covers, linings and the like.

In addition, it should be noticed that materials used, as well as shapes and sizing of the cushioning member of the invention may each time be selected so as to more appropriately meet particular requirements or suit a particular application.

The invention claimed is:

1. A cushioning member having a wavy conformation, comprising:
   elastically deformable bands provided in a juxtaposed arrangement relative to each other according to a substantially longitudinal orientation, each of said bands having undulations which are inclined relative to a resting plane; and
   joining strips between at least two of said bands and arranged roughly transversely relative to said bands,
   wherein said bands are integral with said strips and are assigned a final and definitive shape, as required for use for which the cushioning member is intended, by virtue of the cushioning member being produced as a single-piece molding.

2. The cushioning member according to claim 1, further comprising:
   at least one zone exhibiting differentiated elasticity.

3. The cushioning member according to claim 2, wherein said at least one zone exhibits differentiated elasticity by virtue of differing cross-sections
   of said undulations.

4. The cushioning member according to claim 3, wherein at least one of said joining strips extends across an entire transversal extension of said bands so as to interconnect all of said bands.

5. The cushioning member according to claim 4, wherein at least one of said joining strips extends partially across a transversal extension of said bands so as to interconnect at least two of said bands.

6. The cushioning member according to claim 3, wherein at least one of said joining strips extends partially across a transversal extension of said bands so as to interconnect at least two of said bands.

7. The cushioning member according to claim 2, wherein said at least one zone includes at least one of said undulations, with said at least one of said undulations being reinforced by at least one fin, that is obtained integrally with production of the cushioning member, at a portion where said at least one of said undulations undergoes elastic deformation.

8. The cushioning member according to claim 7, wherein at least one of said joining strips extends across an entire transversal extension of said bands so as to interconnect all of said bands.

9. The cushioning member according to claim 8, wherein at least one of said joining strips extends partially across a transversal extension of said bands so as to interconnect at least two of said bands.

10. The cushioning member according to claim 7, wherein at least one of said joining strips extends partially across a transversal extension of said bands so as to interconnect at least two of said bands.

11. The cushioning member according to claim 2, wherein at least one of said joining strips extends across an entire transversal extension of said bands so as to interconnect all of said bands.

12. The cushioning member according to claim 11, wherein
    at least one of said joining strips extends partially across a transversal extension of said bands so as to interconnect at least two of said bands.

13. The cushioning member according to claim 2, wherein at least one of said joining strips extends partially across a transversal extension of said bands so as to interconnect at least two of said bands.

14. A footwear item having a sole comprising the cushioning member according to claim 2,
- wherein said cushioning member is obtained directly in a shape of said sole by virtue of said cushioning member being produced as the single-piece molding, and
- wherein said at least one zone exhibiting differentiated elasticity corresponds to a heel portion of the footwear item.

15. The cushioning member according to claim 1, wherein
- at least one of said joining strips extends across an entire transversal extension of said bands so as to interconnect all of said bands.

16. The cushioning member according to claim 15, wherein
- at least one of said joining strips extends partially across a transversal extension of said bands so as to interconnect at least two of said bands.

17. The cushioning member according to claim 16, wherein
- said joining strips are offset relative to one another.

18. The cushioning member according to claim 17, further comprising:
- a protective or covering layer.

19. The cushioning member according to claim 18, wherein
- said bands and said strips are formed by over-injection molding on said protective or covering layer.

20. The cushioning member according to claim 1, wherein
- at least one of said joining strips extends partially across a transversal extension of said bands so as to interconnect at least two of said bands.

21. A footwear item having a sole comprising the cushioning member according to claim 1,
- wherein said cushioning member is obtained directly in a shape of said sole by virtue of said cushioning member being produced as the single-piece molding.

22. An insole insert comprising the cushioning member according to claim 1, wherein
- said cushioning member is obtained directly in a shape of the insole insert by virtue of said cushioning member being produced as the single-piece molding.

23. A seat for a two-wheeled or three-wheeled vehicle, comprising the cushioning member according to claim 1,
- wherein said cushioning member is obtained essentially in a shape of the seat by virtue of said cushioning member being produced as the single-piece molding.

24. A protective member comprising the cushioning member according to claim 1,
- wherein said cushioning member is obtained directly in a shape of the protective member by virtue of said cushioning member being produced as the single-piece molding.

25. A chair or seat including the cushioning member according to claim 1,
- wherein said cushioning member is obtained directly in a shape of a component, of the chair or seat, adapted to support a part of a human body by virtue of said cushioning member being produced as the single-piece molding.

26. A mattress including the cushioning member according to claim 1.

27. A pillow including the cushioning member according to claim 1.

28. An inflatable mattress or pillow including the cushioning member according to claim 1.

* * * * *